United States Patent
Li et al.

(10) Patent No.: US 11,042,288 B2
(45) Date of Patent: Jun. 22, 2021

(54) INFORMATION PROCESSING METHOD AND ELECTRONIC DEVICE FOR OBTAINING A TOUCH GESTURE OPERATION ON A SUSPENDED BUTTON

(71) Applicant: HUAWEI TECHNOLOGIES CO., LTD., Guangdong (CN)

(72) Inventors: Xiaojuan Li, Beijing (CN); Wenmei Gao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/075,255

(22) PCT Filed: Feb. 4, 2016

(86) PCT No.: PCT/CN2016/073567
§ 371 (c)(1),
(2) Date: Aug. 3, 2018

(87) PCT Pub. No.: WO2017/132963
PCT Pub. Date: Aug. 10, 2017

(65) Prior Publication Data
US 2019/0056859 A1    Feb. 21, 2019

(51) Int. Cl.
*G06F 3/0488* (2013.01)
*G06F 3/0484* (2013.01)
*G06F 3/0481* (2013.01)

(52) U.S. Cl.
CPC ........ *G06F 3/04883* (2013.01); *G06F 3/0484* (2013.01); *G06F 3/0488* (2013.01); *G06F 3/04817* (2013.01); *G06F 3/04842* (2013.01)

(58) Field of Classification Search
CPC .............. G06F 3/04842; G06F 3/0484; G06F 3/04883; G06F 3/04817; G06F 3/0488
(Continued)

(56) References Cited

U.S. PATENT DOCUMENTS 8,745,514 B1 * 6/2014 Davidson .............. G06F 3/0487
345/173
8,816,989 B2 * 8/2014 Nicholson ........... G06F 3/04883
178/18.01
(Continued)

FOREIGN PATENT DOCUMENTS

| CN | 102438092 A | 5/2012 |
|---|---|---|
| CN | 103472996 A | 12/2013 |

(Continued)

OTHER PUBLICATIONS

International Search Report and Written Opinion issued in International Application No. PCT/CN2016/073567 dated Nov. 1, 2016, 21 pages.
(Continued)

*Primary Examiner* — Daniel Samwel
(74) *Attorney, Agent, or Firm* — Fish & Richardson P.C.

(57) ABSTRACT

The present application discloses example information processing methods and electronic devices. One example method includes obtaining a touch gesture operation on a suspended button, and determining, according to the gesture operation, a first pressure intensity value that acts on the suspended button. If a determination is made that the first pressure intensity value is greater than a response pressure threshold, a detection process occurs to determine whether a display location of the suspended button overlaps with a first display icon displayed on a desktop of an electronic device. If it does, a function corresponding to the first display icon is invoked.

20 Claims, 5 Drawing Sheets

(58) Field of Classification Search
USPC .................................................. 715/700–866
See application file for complete search history.

(56) References Cited

U.S. PATENT DOCUMENTS

| | | | |
|---|---|---|---|
| 2006/0022955 A1* | 2/2006 | Kennedy | G06F 3/0414 |
| | | | 345/173 |
| 2006/0132455 A1 | 6/2006 | Rimas-Ribikauskas et al. | |
| 2008/0168403 A1* | 7/2008 | Westerman | G06F 3/04883 |
| | | | 715/863 |
| 2008/0225007 A1 | 9/2008 | Nakadaira et al. | |
| 2011/0107212 A1* | 5/2011 | Jeong | G06F 3/0481 |
| | | | 715/702 |
| 2011/0187655 A1* | 8/2011 | Min | G06F 1/1652 |
| | | | 345/173 |
| 2012/0044169 A1 | 2/2012 | Enami | |
| 2013/0174069 A1* | 7/2013 | Lee | G06F 3/04883 |
| | | | 715/769 |
| 2013/0314364 A1* | 11/2013 | Nicholson | G06F 3/0488 |
| | | | 345/174 |
| 2013/0332892 A1* | 12/2013 | Matsuki | G06F 3/0488 |
| | | | 715/863 |
| 2014/0165006 A1* | 6/2014 | Chaudhri | G06F 3/04817 |
| | | | 715/835 |
| 2014/0293157 A1 | 10/2014 | Hoshi et al. | |
| 2014/0320440 A1 | 10/2014 | Satake | |
| 2014/0331187 A1 | 11/2014 | Hicks et al. | |
| 2014/0362014 A1 | 12/2014 | Ullrich et al. | |

FOREIGN PATENT DOCUMENTS

| | | |
|---|---|---|
| CN | 104021021 A | 9/2014 |
| CN | 104391623 A | 3/2015 |
| CN | 104536641 A | 4/2015 |
| CN | 104965647 A | 10/2015 |
| CN | 105302455 A | 2/2016 |
| JP | 2010055627 A | 3/2010 |
| KR | 20110019220 A | 2/2011 |
| KR | 20110049431 A | 5/2011 |
| KR | 20110058525 A | 6/2011 |
| KR | 20130016329 A | 2/2013 |
| KR | 20130080179 A | 7/2013 |
| WO | 2013061605 A1 | 5/2013 |

OTHER PUBLICATIONS

Office Action issued in Japanese Application No. 2018-540403 dated Jul. 16, 2019, 9 pages (with English translation).
Office Action issued in Korean Application No. 2018-7025055 dated May 25, 2020, 14 pages (with English translation).
Office Action issued in Korean Application No. 2018-7025055 dated Jan. 7, 2021, 12 pages (with English translation).

* cited by examiner

INFORMATION PROCESSING METHOD AND ELECTRONIC DEVICE FOR OBTAINING A TOUCH GESTURE OPERATION ON A SUSPENDED BUTTON

CROSS-REFERENCE TO RELATED APPLICATIONS

This application is a national stage of International Application No. PCT/CN2016/073567, filed on Feb. 4, 2016, which is hereby incorporated by reference in its entirety.

TECHNICAL FIELD

The present invention relates to the field of electronics technologies, and in particular, to an information processing method and an electronic device.

BACKGROUND

In the prior art, on a display screen of a mobile electronic device, a suspended button (or a virtual suspended button; both have the same meaning in this specification) is usually displayed for a user to tap. When the user taps the suspended button, more options are displayed for the user to perform other operations on a mobile phone.

For ease of operation, the suspended button is usually displayed on the topmost of a screen display layer. However, the suspended button brings people some inconvenience as well as convenience. When the suspended button appears on the display screen of the mobile electronic device, other content on the display screen is blocked, and it is inconvenient for the user to operate the blocked part (or a part that overlaps with the suspended button). When the user needs to perform an operation on the blocked part, the user has to first move the suspended button, and then perform the operation. This method results in complex operation steps and decreases use comfort of the user.

SUMMARY

The present invention provides an information processing method and an electronic device. The method and the apparatus provided in the present invention resolve a prior-art problem that a suspended button blocks a screen button and a user operation on the blocked button is affected.

According to a first aspect, the present invention provides an information processing method, including:

obtaining a touch gesture operation on a suspended button, and determining, according to the gesture operation, a first pressure intensity value that acts on the suspended button;

if determining that the first pressure intensity value is greater than a response pressure threshold, detecting whether a display location of the suspended button overlaps with a first display icon displayed on a desktop of an electronic device; and if the display location of the suspended button overlaps with the first display icon, invoking a function corresponding to the first display icon.

With reference to the first aspect, in a first possible implementation, the invoking a function corresponding to the first display icon includes:

when the first display icon is an application icon, enabling an application corresponding to the application icon; or when determining that the first display icon is a folder icon and the folder includes multiple applications, generating preview information corresponding to the multiple applications.

With reference to the first aspect, in a second possible implementation, the invoking a function corresponding to the first display icon includes:

determining whether a slide track of the gesture operation is identical to a shape of a preset track; and if the slide track of the gesture operation is identical to the shape of the preset track, detecting a second display icon whose display location has a part that overlaps with the slide track; and determining at least one target display icon from the second display icon, and combining the target display icon and the first display icon into an icon set.

With reference to the second possible implementation of the first aspect, in a third possible implementation, the determining at least one target display icon from the second display icon includes:

detecting a second pressure intensity value of a press from an operation subject corresponding to the slide track on the display location of the second display icon; and when any pressure intensity value is greater than the response pressure threshold, determining the second display icon corresponding to the any pressure intensity value as the target display icon.

With reference to the first aspect, in a first possible implementation, the invoking a function corresponding to the first display icon includes:

detecting a press duration value of the gesture operation; and if the duration value is greater than a time threshold, detecting whether there is an operation of pressing a third display icon within specified duration; and if there is an operation of pressing the third display icon within the specified duration, combining the third display icon and the first display icon into an icon set.

With reference to the second to the fourth possible implementations of the first aspect, in a fifth possible implementation, the method further includes:

detecting whether there is a display icon of a folder in the icon set; and if there is a display icon of a folder in the icon set, adding, to the folder, all display icons in the icon set except the display icon corresponding to the folder.

With reference to the fifth possible implementation of the first aspect, in a sixth possible implementation, the adding, to the folder, all display icons in the icon set except the display icon corresponding to the folder includes:

when there is a display icon of only one folder in the icon set, adding, to the folder, all display icons in the icon set except the display icon corresponding to the folder; or when there are display icons of at least two folders in the icon set, obtaining attribute information of the at least two folders, determining, according to the attribute information, one target folder from the at least two folders, and adding, to the target folder, all display icons in the icon set except the display icon corresponding to the target folder.

With reference to any one of the first aspect, or the first to the fourth possible implementations of the first aspect, in a seventh possible implementation, when it is determined that the pressure intensity value is less than the response pressure threshold, a function corresponding to the suspended button is triggered.

According to a second aspect, another information processing method is provided, including:

obtaining a touch gesture operation on a suspended button, and determining, according to the gesture operation, a pressure intensity value that acts on the suspended button; and if determining that the pressure intensity value is greater than a response pressure threshold, implementing a screenshot function corresponding to the gesture operation.

With reference to the second aspect, in a first possible implementation, the implementing a screenshot function corresponding to the gesture operation includes:

after determining that the pressure intensity value is greater than the response pressure threshold, enabling the screenshot function; and determining whether a slide track of the gesture operation is identical to a shape of a preset track; and if the slide track of the gesture operation is identical to the shape of the preset track, taking a screenshot of an area corresponding to the slide track; or after determining that the pressure intensity value is greater than a response pressure threshold, taking a screenshot of a desktop of the electronic device.

According to a third aspect, an electronic device is provided, where the electronic device includes:

an input unit, configured to: obtain a touch gesture operation on a suspended button, and determine, according to the gesture operation, a first pressure intensity value that acts on the suspended button; and a processor, configured to: if determining that the first pressure intensity value is greater than a response pressure threshold, detect whether a display location of the suspended button overlaps with a first display icon displayed on a desktop of the electronic device; and if the display location of the suspended button overlaps with the first display icon, invoke a function corresponding to the first display icon.

With reference to the third aspect, in a first possible implementation, the invoking a function corresponding to the first display icon includes: when the first display icon is an application icon, enabling an application corresponding to the application icon; or when determining that the first display icon is a folder icon and the folder includes multiple applications, generating preview information corresponding to the multiple applications.

With reference to the third aspect, in a second possible implementation, the invoking a function corresponding to the first display icon includes: determining whether a slide track of the gesture operation is identical to a shape of a preset track; if the slide track of the gesture operation is identical to the shape of the preset track, detecting a second display icon whose display location has a part that overlaps with the slide track; and determining at least one target display icon from the second display icon, and combining the target display icon and the first display icon into an icon set.

With reference to the second possible implementation of the third aspect, in a third possible implementation, the determining at least one target display icon from the second display icon includes: detecting a second pressure intensity value of a press from an operation subject corresponding to the slide track on a display location of the second display icon; and when any pressure intensity value is greater than the response pressure threshold, determining the second display icon corresponding to the any pressure intensity value as the target display icon.

With reference to the third aspect, in a first possible implementation, the invoking a function corresponding to the first display icon includes: detecting a press duration value of the gesture operation; if the duration value is greater than a time threshold, detecting whether there is an operation of pressing a third display icon within specified duration; and if there is an operation of pressing the third display icon within the specified duration, combining the third display icon and the first display icon into an icon set.

With reference to the second to the fourth possible implementations of the third aspect, in a fifth possible implementation, the processor is further configured to: detect whether there is a display icon of a folder in the icon set; and if there is a display icon of a folder in the icon set, add, to the folder, all display icons in the icon set except the display icon corresponding to the folder.

With reference to the fifth possible implementation of the third aspect, in a sixth possible implementation, the adding, to the folder, all display icons in the icon set except the display icon corresponding to the folder includes: when there is a display icon of only one folder in the icon set, adding, to the folder, all display icons in the icon set except the display icon corresponding to the folder; or when there are display icons of at least two folders in the icon set, obtaining attribute information of the at least two folders, determining, according to the attribute information, one target folder from the at least two folders, and adding, to the target folder, all display icons in the icon set except the display icon corresponding to the target folder.

With reference to any one of the third aspect, or the first to the fourth possible implementations of the first aspect, in a seventh possible implementation, the processor is further configured to: when determining that the pressure intensity value is less than the response pressure threshold, trigger a function corresponding to the suspended button.

According to a fourth aspect, an electronic device is provided, including:

an input unit, configured to: obtain a touch gesture operation on a suspended button, and determine, according to the gesture operation, a pressure intensity value that acts on the suspended button; and a processor, configured to: if determining that the pressure intensity value is greater than a response pressure threshold, correspondingly implement a screenshot function.

With reference to the fourth aspect, in a first possible implementation, the implementing a screenshot function corresponding to the gesture operation includes: after determining that the pressure intensity value is greater than the response pressure threshold, enabling the screenshot function; determining whether a slide track of the gesture operation is identical to a shape of a preset track; and if the slide track of the gesture operation is identical to the shape of the preset track, taking a screenshot of an area corresponding to the slide track; or after determining that the pressure intensity value is greater than the response pressure threshold, taking a screenshot of a desktop of the electronic device.

One or two of the foregoing technical solutions have at least the following technical effects:

In the solutions provided in the embodiments of the present invention, a pressure intensity value of a press from a user on a suspended button is detected, so that content blocked by the suspended button can be operated, and comfort of the user is improved.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following further describes the embodiments of the present invention in detail with reference to figures of this specification.

Embodiment

Figure 1:
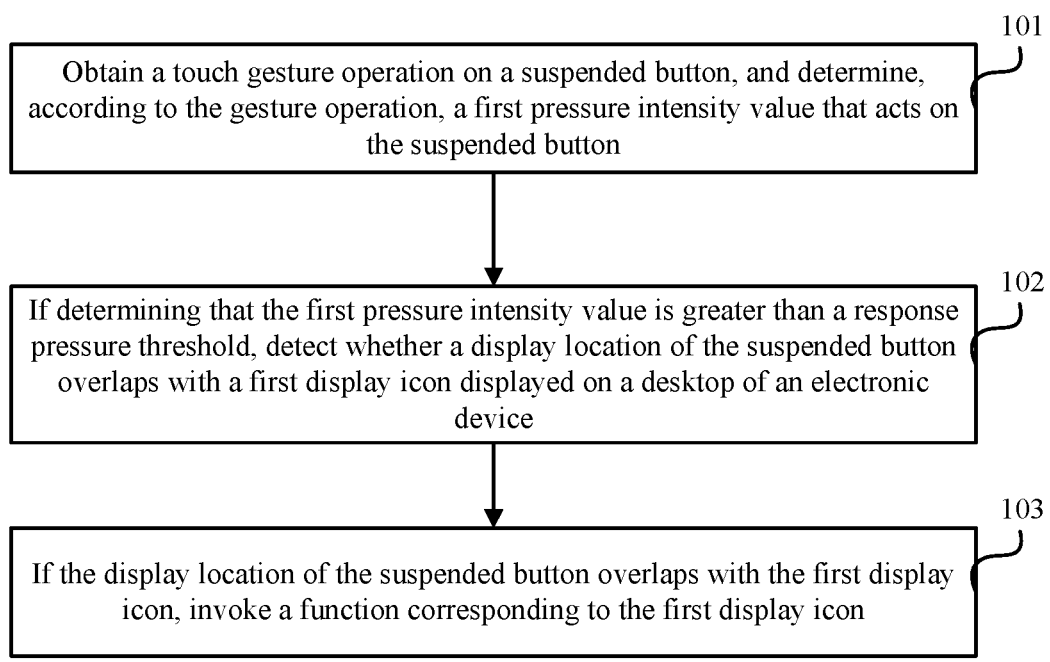
FIG. 1 is a schematic flowchart of an information processing method according to an embodiment of the present invention.

As shown in FIG. 1, to resolve a prior-art problem, the present invention provides an information processing method. Specific implementation of the method includes the following steps.

Step 101. Obtain a touch gesture operation on a suspended button, and determine, according to the gesture operation, a first pressure intensity value that acts on the suspended button.

Currently, a force touch technology is added to many mobile electronic devices. A function of the force touch technology is to detect force of a touch operation, so as to exploit space for control operations of a user. An electronic device configured with the force touch technology may sense a difference between a tap and a press in touch operations, and then trigger a series of associated reactions according to different operations. The electronic device provided in this embodiment of the present invention may determine, by using the force touch technology, a first pressure intensity value of a gesture operation that acts on the suspended button. The solution provided in this embodiment of the present invention is not limited to using the force touch technology. Any technology that can rate operation pressure is applicable to the solution of the present invention.

Step 102. If determining that the first pressure intensity value is greater than a response pressure threshold, detect whether a display location of the suspended button overlaps with a first display icon displayed on a desktop of an electronic device (a display icon in this embodiment of the present invention may also be referred to as an icon).

In the prior art, if a user touches a suspended button, regardless of pressure intensity of a touch operation, only a subdirectory item corresponding to the suspended button is directly displayed. However, in this embodiment, before the suspended button is triggered to be started, a pressure intensity value corresponding to the touch operation of the user is further detected. If the pressure intensity value is greater than a response threshold, it can be determined that the user needs to operate content blocked by the suspended button.

To help the user operate the content blocked by the suspended icon, in this embodiment, transparency of the suspended button may be set to a value less than a specified value (that is, even if the suspended icon with an adjusted transparency covers an icon, the user can recognize the covered icon). In addition, after it is determined that the touch pressure intensity value corresponding to the touch operation of the user is greater than the response pressure threshold, a corresponding user interface may pop up to display the content blocked by the suspended button, for the user to choose whether to operate the blocked part.

Step 103. If the display location of the suspended button overlaps with the first display icon, invoke a function corresponding to the first display icon.

When the pressure intensity value is less than the response pressure threshold, a function corresponding to the suspended button is triggered, so as to implement the original function of the suspended button.

The suspended button blocks another button displayed on a screen, and the user operation is affected. To resolve this problem, in the method provided in this embodiment of the present invention, the touch operation of the user may be classified according to the touch pressure intensity value. If a pressure intensity value of a touch from the user on the suspended button is greater than the response threshold, it is determined that the user needs to perform an operation on the part blocked by the suspended button, instead of directly operating the suspended button. Therefore, a function corresponding to the blocked part is directly invoked, so that a prompt and effective reaction to the user operation can be implemented.

Specifically, in this embodiment of the present invention, there are multiple specific implementations for invoking a function corresponding to the first display icon. The following provides several optimal implementations:

1. Directly enable the function corresponding to the first display icon, specifically including:

(1a) when the first display icon is an application icon, enabling an application corresponding to the application icon; or (1b) when determining that the first display icon is a folder icon and the folder includes multiple applications, generating preview information corresponding to the multiple applications.

2. Classify icons by using the suspended button, specifically including two manners:

Manner 1:

(a1) Determine whether a slide track of the gesture operation is identical to a shape of a preset track; and if the slide track of the gesture operation is identical to the shape of the preset track, detect a second display icon whose display location has a part that overlaps with the slide track.

Figure 2:
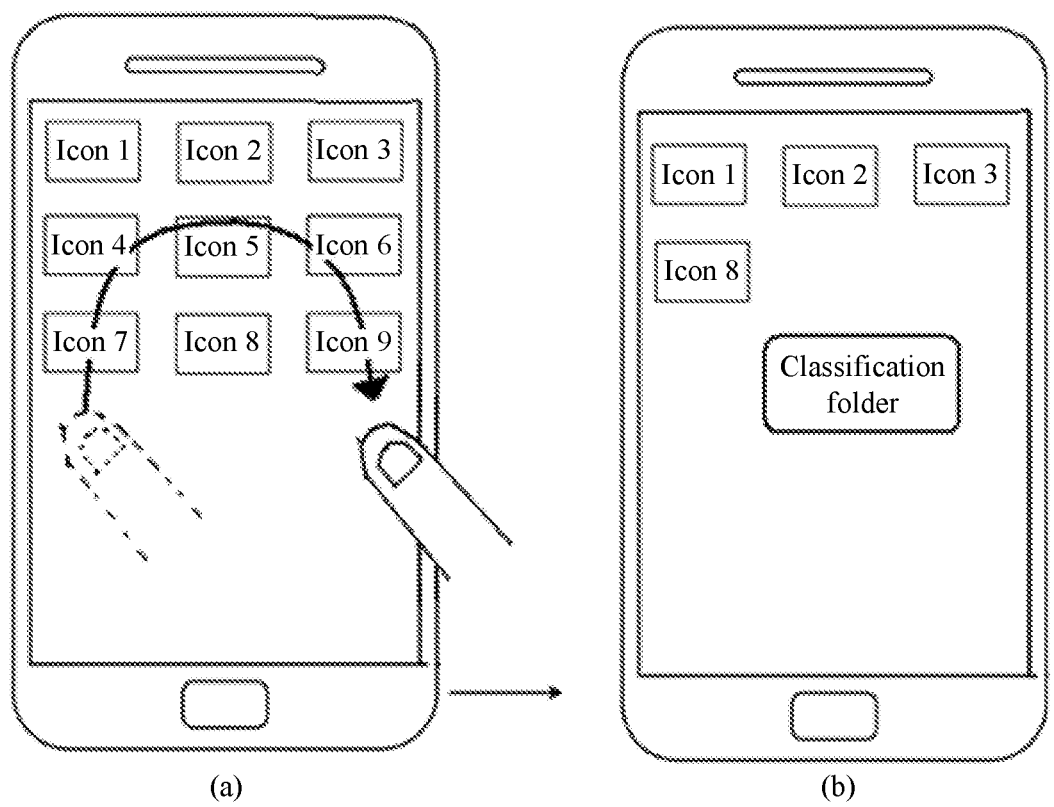
FIG. 2 to FIG. 4 are schematic diagrams of classifying icons by using a touch track according to an embodiment of the present invention.

In this embodiment, the preset track may be any slide track that is easy to operate and/or conforms to a user's usage habit, such as an arc (for example, the arc shown in FIG. 2).

Figure 3:
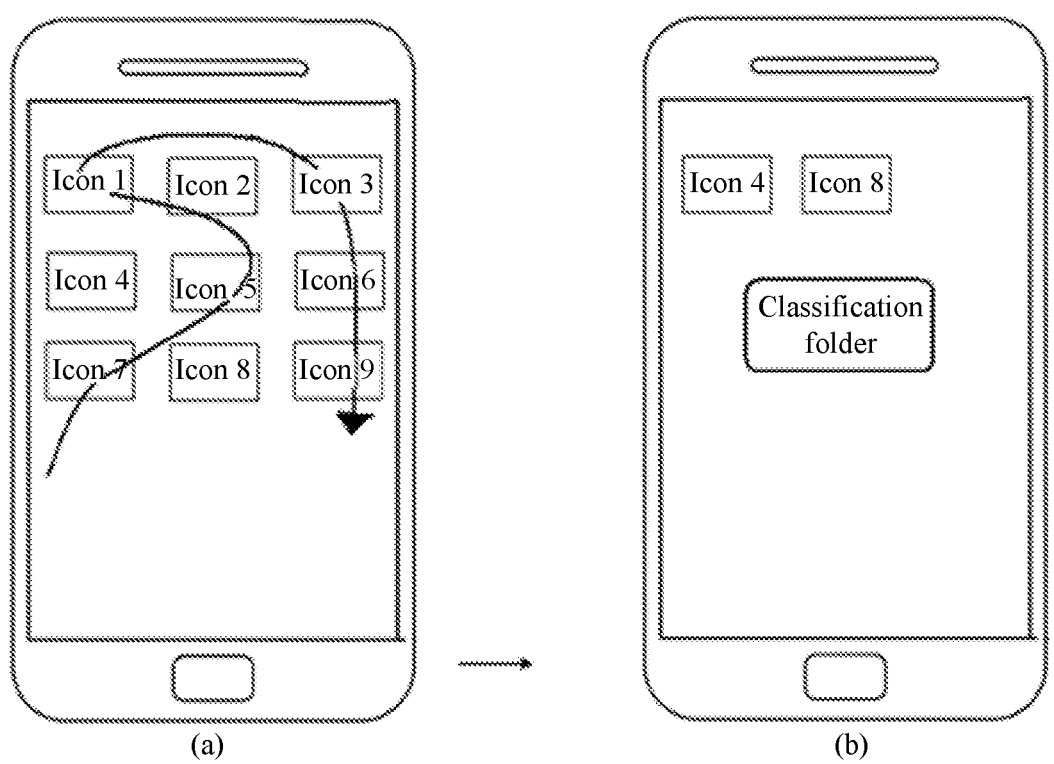

In addition, it may be determined, according to a direction of the slide track and the like, whether the slide track of the gesture operation is identical to the shape of the preset track, because when an icon is selected, a user may slide back and forth on a touchscreen, and an irregular pattern is formed. Therefore, to deal with such a case, it may be determined, according to some characteristic segments or characteristic points extracted from the slide track, and a direction, or a combination thereof, whether the slide track of the gesture operation is identical to the shape of the preset track (as shown in FIG. 3).

Further, it may be determined, according to an area range delineated by the slide track, whether the slide track of the gesture operation is identical to the shape of the preset track. If a display location of a display icon is in the area range, it is determined that the display icon is a second display icon. For example, if the slide track of the user is a closed track, an area in the closed track may be defined as an area range delineated by the slide track. Therefore, a display icon in the closed track is a second display icon.

In this embodiment, when it is detected that an icon overlaps with the slide track, it may be determined that the icon is a to-be-classified icon that is preliminarily selected.

(a2) Determine at least one target display icon from the second display icon, and combine the target display icon and the first display icon into an icon set.

In this embodiment, there may be two manners for determining at least one target display icon from the second display icon. One manner is: when the slide track is formed, overlapping icons that need to be selected and a slide track (as shown in FIG. 3). Another manner is: after a slide track is fixed and multiple icons are preliminarily selected, selecting required icons from the preliminarily selected multiple icons. In this case, specific implementation for determining at least one target display icon from the second display icon may be as follows:

A. Detect a second pressure intensity value of a press from an operation subject corresponding to the slide track on the display location of the second display icon.

In this embodiment, the operation subject is a subject that performs the slide operation, and may be specifically a user's finger or a stylus.

B. When any pressure intensity value is greater than the response pressure threshold, determine the second display icon corresponding to the any pressure intensity value as the target display icon.

In this embodiment, the user can select an icon while inputting the slide track. The selected icon may be determined according to a pressure intensity value of a press from the user on the icon. If the pressure intensity value applied on the icon is greater than the response pressure threshold, it is determined that the icon is the selected icon. In addition, the pressure threshold for determining whether an icon is selected may be identical to the response pressure threshold in step 102. Because a pressure value can be precisely determined by using the existing force touch technology, the pressure threshold herein may alternatively be set to another threshold, provided that the pressure threshold can distinguish between operations.

Manner 2:

(b1) Detect a press duration value of the gesture operation.

(b2) If the duration value is greater than a time threshold, detect whether there is an operation of pressing a third display icon within specified duration; and if there is an operation of pressing the third display icon within the specified duration, combine the third display icon and the first display icon into an icon set.

Figure 4:
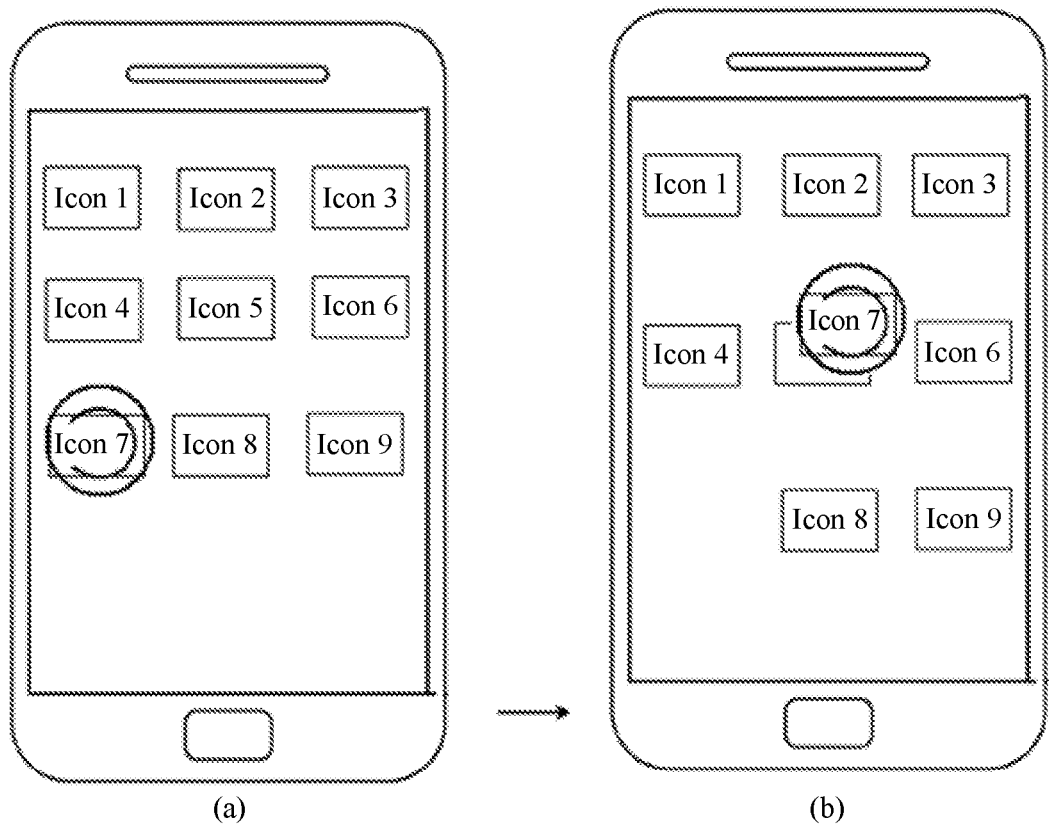

In this example, first, determine, according to the duration value, whether the user enables an icon classification function. After the first icon is selected, if the duration of pressing the icon exceeds the time threshold, it may be determined that the icon classification function is enabled. Then, the user may select to-be-classified icons under the function. A manner of selecting icons under the function may be an operation that can be recognized by the electronic device, such as a tap or a double tap. As shown in FIG. 4, in a of FIG. 4, when duration of a press from the user on an icon of a control 7 exceeds the time threshold, a classification function is enabled correspondingly. Then, if the user moves to a next icon (for example, a location of an icon 5) to perform a touch operation, and press duration exceeds the time threshold, it may be determined that the icon 5 is selected (a specific display effect presented may be that the icon 7 and the icon 5 overlap, as shown in FIG. 4*b*). Certainly, in a specific application, more icons may be selected, and a specific implementation is identical to the manner of selecting the icon 5.

Manner 1 and Manner 2 implement classification of multiple icons. Specifically, the multiple classified icons may be placed in two manners.

1. Create a folder, and place selected classified icons into the newly created folder.

2. If a folder icon exists in the selected icons, place all the selected icons except the folder icon into the folder corresponding to the folder icon. Specific implementation may be as follows:

A. Detect whether there is a display icon of a folder in the icon set; and if there is a display icon of a folder in the icon set, add, to the folder, all display icons in the icon set except the display icon corresponding to the folder.

In a specific classification method, because a quantity of selected folder icons is undetermined, a method for implementing, according to the quantity of the folder icons, the "adding, to the folder, all display icons in the icon set except the display icon corresponding to the folder" includes:

B1: when there is a display icon of only one folder in the icon set, adding, to the folder, all display icons in the icon set except the display icon corresponding to the folder; or B2. when there are display icons of at least two folders in the icon set, obtaining attribute information of the at least two folders, determining, according to the attribute information, one target folder from the at least two folders, and adding, to the target folder, all display icons in the icon set except the display icon corresponding to the target folder.

In this embodiment, attribute information of a folder may be parameter information that can be used to distinguish between folders, such as a time when a folder is selected during icon selection, a name of the folder, a creation time of the folder, a storage location of the folder, or tag information of the folder (the tag information may be preset by the user and indicate that a folder with a tag is preferably selected as a target folder when there are multiple folders). If the attribute information is the creation time of the folder, a rule may be set to that a most recently created folder is used as the target folder. Certainly, a rule may be set to that an earliest created folder is used as the target folder. In a specific application environment, the rule may be set according to an actual requirement. The foregoing manner is merely an example of this embodiment, and implementation of the solution in this embodiment is not limited to the foregoing several manners.

In a specific application, for aesthetic appeal and orderliness of the user interface, a folder formed after the classification may be displayed in a location of an original folder, and all icons are re-arranged.

In the solution provided in this embodiment of the present invention, a pressure intensity value of a press from a user on a suspended button is detected, so that content blocked by the suspended button can be operated, and comfort of the user is improved.

Further, in the present invention, the suspended button is adjusted to an active state according to a specific track and press duration, so that multiple icons are classified. In this way, a user operation is simplified, and user experience is improved.

Embodiment

Figure 5:
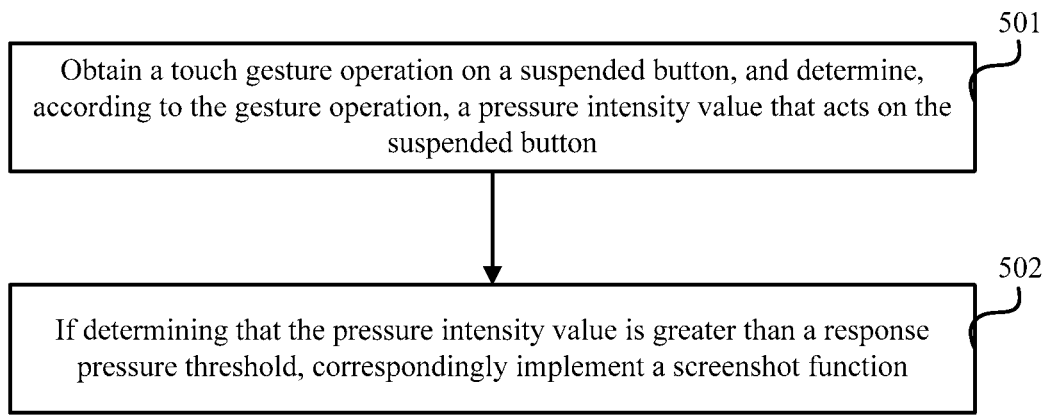
FIG. 5 is a schematic flowchart of an information processing method according to an embodiment of the present invention.

As shown in FIG. 5, an embodiment of the present invention further provides an information processing method. The method specifically includes the following steps.

Currently, a screenshot operation of an electronic device is generally triggered by using a composite key or performed by using a complex specific gesture. However, these operations are not easy to implement and do not meet a use comfort requirement of a user. Therefore, in this embodiment, a more convenient screenshot manner combining pressure intensity detection and a suspended icon is provided. Specific implementation may be as follows:

Step 501. Obtain a touch gesture operation on a suspended button, and determine, according to the gesture operation, a pressure intensity value that acts on the suspended button.

Step 502. If determining that the pressure intensity value is greater than a response pressure threshold, implement a screenshot function corresponding to the gesture operation.

A specific screenshot manner includes taking a screenshot of a part of display content on a screen or taking a screenshot of display content on an entire screen. The implementing a screenshot function corresponding to the gesture operation specifically includes:

a. after determining that the pressure intensity value is greater than the response pressure threshold, enabling the screenshot function; and b. determining whether a slide track of the gesture operation is identical to a shape of a preset track; and if the slide track of the gesture operation is identical to the shape of the preset track, taking a screenshot of an area corresponding to the slide track; or after determining that the pressure intensity value is greater than the response pressure threshold, taking a screenshot of a desktop of the electronic device (that is, taking a screenshot of display content on the entire screen).

For example, after the screenshot function is enabled, if the user inputs a closed track on the screen, display content in the closed track is taken as content of a screenshot. Alternatively, a box select tool such as a rectangle may be directly invoked to select a specific location and a specific range for a screenshot according to an operation of the user.

Embodiment

Figure 6:
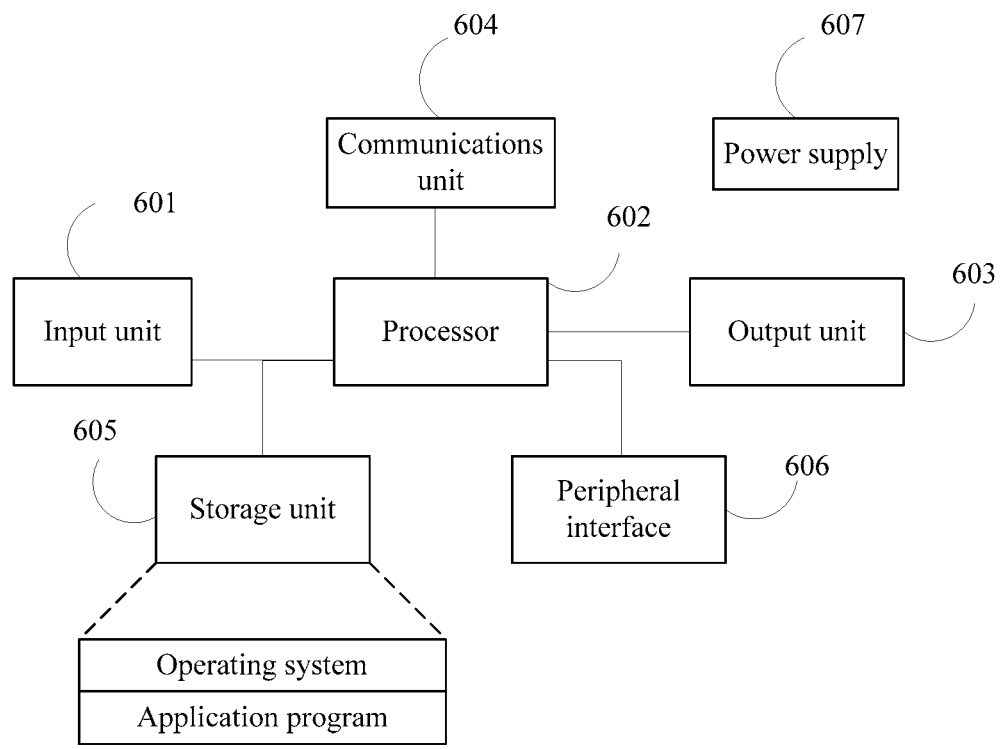
FIG. 6 is a schematic structural diagram of an electronic device according to an embodiment of the present invention.

FIG. 6 shows an electronic device according to a specific implementation of the present invention. The electronic device includes an input unit 601, a processor 602, an output unit 603, a communications unit 604, a storage unit 605, a peripheral interface 606, and a power supply 607. These units communicate by using one or more buses. A person skilled in the art may understand that a structure of the electronic device shown in the figure does not constitute a limitation on the present invention. The electronic device may be of a bus-shaped structure or a star-shaped structure, and may include more or fewer components than those shown in the figure, or a combination of some components, or the components disposed differently. In this implementation of the present invention, the electronic device may be any mobile or portable electronic device, including but not limited to a mobile phone, a mobile computer, a tablet computer, a personal digital assistant (Personal Digital Assistant, PDA), a media player, a combination of at least two of the foregoing devices, or the like.

The input unit is configured to implement interaction between a user and the electronic device, and/or input information to the electronic device. For example, the input unit may receive digital or character information entered by the user, to generate signal input related to user settings or function control. In a specific implementation of the present invention, the input unit may be a touch panel or may be another man-machine interface, such as a substantive input key or a microphone, or may be another external apparatus for collecting information, such as a camera. The touch panel, also referred to as a touchscreen or a touch control screen, may collect a touch operation or action performed by a user on or near the touch panel, for example, an operation or action performed on or near the touch panel by using a finger, a stylus, or any suitable object or accessory, and drive a corresponding connection apparatus according to a preset program. Optionally, the touch panel may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into contact coordinates, and then transmits the contact coordinates to the processor. The touch controller may further receive a command sent by the processing unit, and execute the command. In addition, the touch panel may be implemented by using multiple types, such as a resistive type, a capacitive type, an infrared (Infrared) type, and a surface acoustic wave type. In another implementation of the present invention, the substantive input key used as the input unit may include but is not limited to one or more of a physical keyboard, a function key (such as a volume control key or an on/off key), a trackball, a mouse, and a joystick. The input unit in a microphone form may collect voice input by the user or an environment, and convert the voice into a command that is in an electrical signal form and that can be executed by the processing unit.

In some other implementations of the present invention, the input unit may alternatively be various sensing devices, for example, a Hall component, configured to detect a physical quantity for the electronic device, such as force, torque, pressure, stress, a location, a displacement, a speed, an acceleration, an angle, an angular velocity, a quantity of revolutions, a rotation speed, and a time when a working state changes, and converts the physical quantity into a quantity of electricity for detection and control. Other sensing devices may include a gravity sensor, a tri-axis accelerometer, a gyroscope, an electronic compass, an ambient light sensor, a proximity sensor, a temperature sensor, a humidity sensor, a pressure sensor, a heart rate sensor, a fingerprint sensor, and the like.

The input unit includes but is not limited to an image output unit and an audio output unit. The image output unit is configured to output a text, a picture, and/or a video. The image output unit may include a display panel, for example, a display panel configured in a form of an LCD (Liquid Crystal Display, liquid crystal display), an OLED (Organic Light-Emitting Diode, organic light-emitting diode), a field emission display (field emission display, FED for short), or the like. Alternatively, the image output unit may include a reflective display, for example, an electrophoretic (electrophoretic) display or a display using a technology of interferometric modulation of light (Interferometric Modulation of Light). The image output unit may include a single display or multiple displays of different sizes. In a specific implementation of the present invention, the touch panel used as the foregoing input unit may also be used as a display panel of the output unit. For example, after detecting a touch operation on the touch panel or a gesture operation near the touch panel, the touch panel transmits the operation to the processing unit to determine a touch event type. Then, the processing unit provides corresponding visual output on the display panel according to the touch event type. In FIG. 8, although the input unit and the output unit are used as two independent components to implement an input function and an output function of the electronic device, in some embodiments, the touch panel and the display panel may be integrated to implement the input function and the output function of the electronic device. For example, the image output unit may display various graphical user interfaces (Graphical User Interface, GUI for short) as virtual control components, including but not limited to a window, a scroll bar, an icon, or a clipbook, for the user to perform an operation by means of touch.

In a specific implementation of the present invention, the image output unit includes a filter and an amplifier, configured to filter and amplify a video output by the processing unit. The audio output unit includes a digital-to-analog converter, configured to convert an audio signal output by the processing unit from a digital format to an analog format.

The processor is a control center of the electronic device, is connected to all parts of the entire electronic device by using various interfaces and lines, and executes various functions of the electronic device and/or processes data by running or executing a software program and/or a module stored in the storage unit, and invoking data stored in the storage unit. The system control module may include an integrated circuit (Integrated Circuit, IC for short), for example, may include a single packaged IC or multiple packaged ICs having same or different functions. For example, the processor may include only a central processing unit (Central Processing Unit, CPU for short), or may be a combination of a GPU, a digital signal processor (Digital Signal Processor, DSP for short), and a control chip (for example, a baseband chip) of a communications management module. In this implementation of the present invention, the CPU may be a single computing core, or may include multiple computing cores.

The communications unit is configured to establish a communication channel, so that the electronic device performs voice communication, text communication, and data communication with a remote electronic device or a server by using the communication channel. The communications unit may include a communications module such as a wireless local area network (Wireless Local Area Network, wireless LAN for short) module, a Bluetooth module, and a baseband (Base Band) module, and include a radio frequency (Radio Frequency, RF for short) circuit corresponding to the communications module. The communications module is configured to perform wireless local area network communication, Bluetooth communication, infrared communication, and/or cellular communications system communication, for example, Wideband Code Division Multiple Access (Wideband Code Division Multiple Access, W-CDMA for short) and/or high speed downlink packet access (High Speed Downlink Packet Access, HSDPA for short). The communications module is configured to control communication between the components in the electronic device, and may support direct memory access (Direct Memory Access).

In different implementations of the present invention, various communications modules in the communications unit generally appear in a form of an integrated circuit chip (Integrated Circuit Chip), and may be selectively combined, without requiring that all communications modules and a corresponding antenna set should be included. For example, the communications unit may include only a baseband chip, a radio frequency chip, and a corresponding antenna, to provide a communication function in a cellular communications system. By using a wireless communications connection established by the communications unit, for example, in wireless local area network access or WCDMA access, the electronic device may be connected to a cellular network (Cellular Network) or the Internet (Internet).

The radio frequency circuit is configured to receive and send information, or receive and send a signal during a call. For example, after receiving downlink information of a base station, the radio frequency circuit sends the downlink information to the processing unit for processing, and additionally, sends uplink-related data to the base station. Generally, the radio frequency circuit includes a well-known circuit executing these functions, including but not limited to an antenna system, a radio frequency transceiver, one or more amplifiers, a tuner, one or more oscillators, a digital signal processor, a codec (Codec) chip set, a subscriber identity module (SIM) card, and a memory. In addition, the radio frequency circuit may further communicate with a network and another device by means of wireless communications. Any communications standard or protocol may be used for the wireless communications, including but not limited to a GSM (Global System of Mobile communication, Global System for Mobile Communications), a GPRS (General Packet Radio Service, general packet radio service), CDMA (Code Division Multiple Access, Code Division Multiple Access), WCDMA (Wideband Code Division Multiple Access, Wideband Code Division Multiple Access), High Speed Downlink Packet Access (High Speed Downlink Packet Access, HSDPA), LTE (Long Term Evolution, Long Term Evolution), an email, and an SMS (Short Messaging Service, short message service).

The storage unit may be configured to store a software program and a module. The processing unit executes various function applications of the electronic device and processes data by running the software program and the module stored in the storage unit. The storage unit mainly includes a program storage area and a data storage area. The program storage area may store an operating system, an application program required for at least one function, such as a sound playback program or an image playback program. The data storage area may store data (such as audio data or a phone book) created according to use of the electronic device, and the like. In a specific implementation of the present invention, the storage unit may include a volatile memory, for example, a nonvolatile random access memory (Nonvolatile Random Access Memory, NVRAM for short), a phase change random access memory (Phase Change RAM, PRAM for short), and a magnetoresistive random access memory (Magetoresistive RAM, MRAM for short), and may further include a non-volatile memory, for example, at least one magnetic disk storage component, an electrically erasable programmable read-only memory (Electrically Erasable Programmable Read-Only Memory, EEPROM for short), and a flash memory device such as a NOR flash memory (NOR flash memory) or a NAND flash memory (NAND flash memory). The nonvolatile memory stores an operating system on which the processing unit runs and an application program that is executed by the processing unit. The processing unit loads, from the nonvolatile memory, the running program and the data to a memory, and stores digital content in a large-capacity storage apparatus. The operating system includes various components and/or drivers that are used for control and management of a conventional system task such as memory management, storage device control, and power supply management, and that are conducive to communication between software and hardware.

In this implementation of the present invention, the operating system may be an Android system of Google Inc., an iOS system developed by Apple Inc., or a Windows system/a Windows Phone system, or the like developed by Microsoft Corporation, or an embedded operating system such as VxWorks.

The application program includes any application installed on the electronic device, including but not limited to a browser, an email, an instant messaging service, word processing, keyboard virtualization, a widget (Widget), encryption, digital copyright management, speech recognition, speech duplication, positioning (for example, a function provided by a Global Positioning System), and music playback.

The power supply is configured to supply power to different components of the electronic device, so as to keep the electronic device running. Generally, the power supply may be a built-in battery, for example, a common lithium-ion battery or a NiMH battery, or may be an external power supply that directly supplies power to the electronic device, for example, an AC adapter. In some implementations of the present invention, the power supply may have more extensive definitions. For example, the power supply may further include a power management system, a charging system, a power supply failure detection circuit, a power converter or inverter, a power supply status indicator (such as a light emitting diode), and any other component related to electric energy generation, management, distribution of the electronic device.

Based on the structure shown in FIG. 6, to implement the solution of the embodiment shown in FIG. 1, specific implementation may include:

an input unit 601, configured to: obtain a touch gesture operation on a suspended button, and determine, according to the gesture operation, a first pressure intensity value that acts on the suspended button; and a processor 602, configured to: if determining that the first pressure intensity value is greater than a response pressure threshold, detect whether a display location of the suspended button overlaps with a first display icon displayed on a desktop of the electronic device; and if the display location of the suspended button overlaps with the first display icon, invoke a function corresponding to the first display icon.

Optionally, the invoking a function corresponding to the first display icon includes: when the first display icon is an application icon, enabling an application corresponding to the application icon; or when determining that the first display icon is an icon of a folder and the folder includes multiple applications, generating preview information corresponding to the multiple applications.

Optionally, the invoking a function corresponding to the first display icon includes: determining whether a slide track of the gesture operation is identical to a shape of a preset track; if the slide track of the gesture operation is identical to the shape of the preset track, detecting a second display icon whose display location has a part that overlaps with the slide track; and determining at least one target display icon from the second display icon, and combining the target display icon and the first display icon into an icon set.

Optionally, the determining at least one target display icon from the second display icon includes: detecting a second pressure intensity value of a press from an operation subject corresponding to the slide track on a display location of the second display icon; and when any pressure intensity value is greater than the response pressure threshold, determining the second display icon corresponding to the any pressure intensity value as the target display icon.

Optionally, the invoking a function corresponding to the first display icon includes: detecting a press duration value of the gesture operation; if the duration value is greater than a time threshold, detecting whether there is an operation of pressing a third display icon within specified duration; and if there is an operation of pressing the third display icon within the specified duration, combining the third display icon and the first display icon into an icon set.

Optionally, the processor is further configured to: detect whether there is a display icon of a folder in the icon set; and if there is a display icon of a folder in the icon set, add, to the folder, all display icons in the icon set except the display icon corresponding to the folder.

Optionally, the adding, to the folder, all display icons in the icon set except the display icon corresponding to the folder includes: when there is a display icon of only one folder in the icon set, adding, to the folder, all display icons in the icon set except the display icon corresponding to the folder; or when there are display icons of at least two folders in the icon set, obtaining attribute information of the at least two folders, determining, according to the attribute information, one target folder from the at least two folders, and adding, to the target folder, all display icons in the icon set except the display icon corresponding to the target folder.

Optionally, the processor is further configured to: when determining that the pressure intensity value is less than the response pressure threshold, trigger a function corresponding to the suspended button.

Another Embodiment

Based on the structure shown in FIG. 6, an embodiment of the present invention further provides another electronic device. An implementation specifically includes:

an input unit 601, configured to: obtain a touch gesture operation on a suspended button, and determine, according to the gesture operation, a pressure intensity value that acts on the suspended button; and a processor 602, configured to: if determining that the pressure intensity value is greater than a response pressure threshold, implement a screenshot function corresponding to the gesture operation.

Optionally, the processor is specifically configured to: after determining that the pressure intensity value is greater than the response pressure threshold, enable the screenshot function; and determine whether a slide track of the gesture operation is identical to a shape of a preset track; and if the slide track of the gesture operation is identical to the shape of the preset track, take a screenshot of an area corresponding to the slide track; or after determining that the pressure intensity value is greater than the response pressure threshold, take a screenshot of a desktop of the electronic device.

Figure 7:
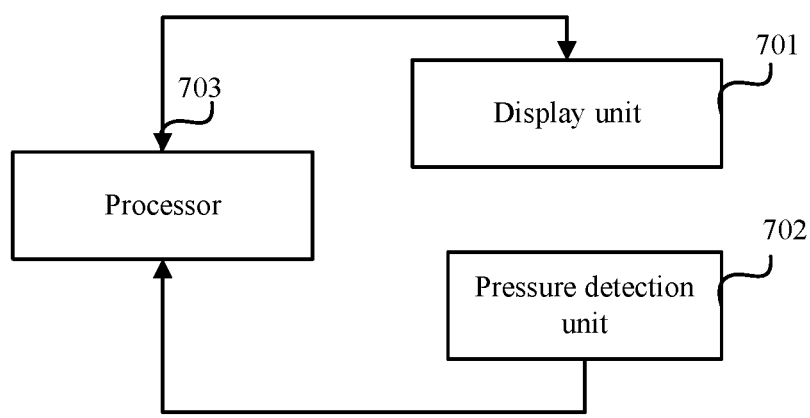
FIG. 7 is a schematic structural diagram of a touch panel according to an embodiment of the present invention.

In a specific example of the foregoing embodiment, as shown in FIG. 7, an embodiment of the present invention provides an electronic device, specifically including:

a display unit 701, configured to display a suspended button;

a pressure detection unit 702, configured to: obtain an operation on the suspended button, and determine a pressure intensity value corresponding to the operation; and a processor 703, configured to: if determining that the first pressure intensity value is greater than a response pressure threshold, detect whether a display location of the suspended button overlaps with a first display icon displayed on a desktop of the electronic device; and if the display location of the suspended button overlaps with the first display icon, invoke a function corresponding to the first display icon.

Optionally, the invoking a function corresponding to the first display icon includes: when the first display icon is an application icon, enabling an application corresponding to the application icon; or when determining that the first display icon is an icon of a folder and the folder includes multiple applications, generating preview information corresponding to the multiple applications.

Optionally, the display unit and the pressure detection unit are combined to form a touch display screen that has a pressure detection function, and the operation may be a touch gesture operation. Therefore, in this example, specific implementation of invoking a function corresponding to the first display icon may be as follows:

1. Determine whether a slide track of the gesture operation is identical to a shape of a preset track; if the slide track of the gesture operation is identical to the shape of the preset track, detect a second display icon whose display location has a part that overlaps with the slide track; and determine at least one target display icon from the second display icon, and combine the target display icon and the first display icon into an icon set.

Optionally, the determining at least one target display icon from the second display icon includes: detecting a second pressure intensity value of a press from an operation subject corresponding to the slide track on a display location of the second display icon; and when any pressure intensity value is greater than the response pressure threshold, determining the second display icon corresponding to the any pressure intensity value as the target display icon.

2. Detect a press duration value of the gesture operation; if the duration value is greater than a time threshold, detect whether there is an operation of pressing a third display icon within specified duration; and if there is an operation of pressing the third display icon within the specified duration, combine the third display icon and the first display icon into an icon set.

Optionally, the processor is further configured to: detect whether there is a display icon of a folder in the icon set; and if there is a display icon of a folder in the icon set, add, to the folder, all display icons in the icon set except the display icon corresponding to the folder.

Optionally, the adding, to the folder, all display icons in the icon set except the display icon corresponding to the folder includes: when there is a display icon of only one folder in the icon set, adding, to the folder, all display icons in the icon set except the display icon corresponding to the folder; or when there are display icons of at least two folders in the icon set, obtaining attribute information of the at least two folders, determining, according to the attribute information, one target folder from the at least two folders, and adding, to the target folder, all display icons in the icon set except the display icon corresponding to the target folder.

Optionally, the processor is further configured to: when determining that the pressure intensity value is less than the response pressure threshold, trigger a function corresponding to the suspended button.

The foregoing one or more technical solutions in the embodiments of this application have at least the following technical effects:

In the solutions provided in the embodiments of the present invention, a pressure intensity value of a press from a user on a suspended button is detected, so that content blocked by the suspended button can be operated, and comfort of the user is improved.

Further, in the present invention, the suspended button is adjusted to an active state according to a specific track and press duration, so that multiple icons are classified. In this way, a user operation is simplified, and user experience is improved.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, a built-in processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded on a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An information processing method, comprising:
   obtaining a touch gesture operation on a floating button;
   determining, according to the touch gesture operation, that a first pressure intensity value that acts on the floating button is greater than a response pressure threshold; and in response to determining that the first pressure intensity value is greater than the response pressure threshold:
  determining whether a display location of the floating button overlaps with a first display icon displayed on a desktop of an electronic device, wherein a plurality of display icons including the first display icon are displayed on the desktop;
  in response to determining that the display location of the floating button overlaps with the first display icon, invoking a function corresponding to the first display icon, wherein invoking the function corresponding to the first display icon includes popping up a user interface to display content blocked by the floating button; and
  in response to determining that the display location of the floating button does not overlap with the first display icon, invoking a function corresponding to the floating button.

2. The method according to claim 1, wherein the invoking a function corresponding to the first display icon comprises:
  when the first display icon is an application icon, enabling an application corresponding to the application icon; or
  when determining that the first display icon is a folder icon and the folder comprises multiple applications, generating preview information corresponding to the multiple applications.

3. The method according to claim 1, wherein the invoking a function corresponding to the first display icon comprises:
  determining whether a slide track of the touch gesture operation is identical to a shape of a preset track;
  in response to a determination that the slide track of the touch gesture operation is identical to the shape of the preset track, detecting a second display icon whose display location has a part that overlaps with the slide track;
  determining at least one target display icon from the second display icon; and
  combining the target display icon and the first display icon into an icon set.

4. The method according to claim 3, wherein the determining at least one target display icon from the second display icon comprises:
  detecting a second pressure intensity value of a press from an operation subject corresponding to the slide track on the display location of the second display icon; and
  in response to detecting any pressure intensity value is greater than the response pressure threshold, determining the second display icon corresponding to the any pressure intensity value as the target display icon.

5. The method according to claim 1, wherein the invoking a function corresponding to the first display icon comprises:
  detecting a press duration value of the touch gesture operation;
  in response to detecting that the press duration value is greater than a time threshold, detecting whether there is an operation of pressing a third display icon within specified duration; and
  in response to detecting that there is an operation of pressing the third display icon within the specified duration, combining the third display icon and the first display icon into an icon set.

6. The method according to claim 3, wherein the method further comprises:
  detecting whether there is a display icon of a folder in the icon set; and
  in response to detecting that there is a display icon of a folder in the icon set, adding, to the folder, all display icons in the icon set except the display icon corresponding to the folder.

7. The method according to claim 6, wherein the adding, to the folder, all display icons in the icon set except the display icon corresponding to the folder comprises:
  when there is a display icon of only one folder in the icon set, adding, to the folder, all display icons in the icon set except the display icon corresponding to the folder; or
  when there are display icons of at least two folders in the icon set, obtaining attribute information of the at least two folders, determining, according to the attribute information, one target folder from the at least two folders, and adding, to the target folder, all display icons in the icon set except the display icon corresponding to the target folder.

8. An electronic device, wherein the electronic device comprises:
  a touch-based input interface, the touch-based input interface configured to:
    obtain a touch gesture operation on a floating button; and
    determine, according to the touch gesture operation, that a first pressure intensity value that acts on the floating button is greater than a response pressure threshold; and
  at least one processor, the at least one processor configured to:
    in response to determining that the first pressure intensity value is greater than the response pressure threshold:
      determine whether a display location of the floating button overlaps with a first display icon displayed on a desktop of the electronic device, wherein a plurality of display icons including the first display icon are displayed on the desktop;
      in response to determining that the display location of the floating button overlaps with the first display icon, invoke a function corresponding to the first display icon, wherein invoking the function corresponding to the first display icon includes popping up a user interface to display content blocked by the floating button; and
      in response to determining that the display location of the floating button does not overlap with the first display icon, invoke a function corresponding to the floating button.

9. The electronic device according to claim 8, wherein the invoking a function corresponding to the first display icon comprises:
  when the first display icon is an application icon, enabling an application corresponding to the application icon; or
  when determining that the first display icon is a folder icon and the folder comprises multiple applications, generating preview information corresponding to the multiple applications.

10. The electronic device according to claim 8, wherein the invoking a function corresponding to the first display icon comprises:
  determining whether a slide track of the touch gesture operation is identical to a shape of a preset track;
  in response to a determination that the slide track of the touch gesture operation is identical to the shape of the preset track, detecting a second display icon whose display location has a part that overlaps with the slide track;

determining at least one target display icon from the second display icon; and combining the target display icon and the first display icon into an icon set.

11. The electronic device according to claim 10, wherein the determining at least one target display icon from the second display icon comprises:

detecting a second pressure intensity value of a press from an operation subject corresponding to the slide track on a display location of the second display icon; and in response to detecting any pressure intensity value is greater than the response pressure threshold, determining the second display icon corresponding to the any pressure intensity value as the target display icon.

12. The electronic device according to claim 8, wherein the invoking a function corresponding to the first display icon comprises:

detecting a press duration value of the touch gesture operation;

in response to detecting that the press duration value is greater than a time threshold, detecting whether there is an operation of pressing a third display icon within specified duration; and in response to detecting that there is an operation of pressing the third display icon within the specified duration, combining the third display icon and the first display icon into an icon set.

13. The electronic device according to claim 10, wherein the at least one processor is further configured to:

detect whether there is a display icon of a folder in the icon set; and in response to detecting that there is a display icon of a folder the icon set, add, to the folder, all display icons in the icon set except the display icon corresponding to the folder.

14. The electronic device according to claim 13, wherein the adding, to the folder, all display icons in the icon set except the display icon corresponding to the folder comprises:

when there is a display icon of only one folder in the icon set, adding, to the folder, all display icons in the icon set except the display icon corresponding to the folder; or when there are display icons of at least two folders in the icon set, obtaining attribute information of the at least two folders, determining, according to the attribute information, one target folder from the at least two folders, and adding, to the target folder, all display icons in the icon set except the display icon corresponding to the target folder.

15. The electronic device according to claim 8, wherein the at least one processor is further configured to: when determining that the first pressure intensity value is less than the response pressure threshold, trigger a function corresponding to the floating button.

16. An electronic device, comprising:
a display;
at least one processor; and
a non-transitory computer-readable storage medium coupled to the at least one processor and storing programming instructions for execution by the at least one processor, the programming instructions instruct the at least one processor to:
display a floating button on the display;
obtain an operation on the floating button;
determine that a pressure intensity value corresponding to the operation is greater than a response pressure threshold;

in response to determining that the pressure intensity value is greater than the response pressure threshold:

determine whether a display location of the floating button overlaps with a first display icon displayed on a desktop of the electronic device, wherein a plurality of display icons including the first display icon are displayed on the desktop;

in response to determining that the display location of the floating button overlaps with the first display icon, invoke a function corresponding to the first display icon, wherein invoking the function corresponding to the first display icon includes popping up a user interface to display content blocked by the floating button; and in response to determining that the display location of the floating button does not overlap with the first display icon, invoke a function corresponding to the floating button.

17. The electronic device according to claim 16, wherein the invoking a function corresponding to the first display icon comprises:

when the first display icon is an application icon, enabling an application corresponding to the application icon; or when determining that the first display icon is a folder icon and the folder comprises multiple applications, generating preview information corresponding to the multiple applications.

18. The electronic device according to claim 16, wherein the display and a pressure detector are combined to form a touch display screen that supports pressure detection, the operation is a touch gesture operation, and the invoking a function corresponding to the first display icon comprises:

determining whether a slide track of the touch gesture operation is identical to a shape of a preset track;

in response to a determination that the slide track of the touch gesture operation is identical to the shape of the preset track, detecting a second display icon whose display location has a part that overlaps with the slide track;

determining at least one target display icon from the second display icon; and combining the target display icon and the first display icon into an icon set.

19. The electronic device according to claim 18, wherein the determining at least one target display icon from the second display icon comprises:

detecting a second pressure intensity value of a press from an operation subject corresponding to the slide track on the display location of the second display icon; and in response to detecting that any pressure intensity value is greater than the response pressure threshold, determining the second display icon corresponding to the any pressure intensity value as the target display icon.

20. The electronic device according to claim 18, wherein the invoking a function corresponding to the first display icon comprises:

detecting a press duration value of the touch gesture operation;

in response to detecting that the press duration value is greater than a time threshold, detecting whether there is an operation of pressing a third display icon within specified duration; and in response to detecting that there is an operation of pressing the third display icon within the specified duration, combining the third display icon and the first display icon into an icon set.

* * * * *